United States Patent [19]
MacDonald et al.

[11] 3,922,331
[45] Nov. 25, 1975

[54] PREPARATION OF MICROPOROUS RARE-EARTH OXYHALIDES

[75] Inventors: David J. MacDonald, Reno; Judith A. Eisele, Verdi, both of Nev.

[73] Assignee: The United States of America as represented by the Secretary of the Interior, Washington, D.C.

[22] Filed: Nov. 14, 1973

[21] Appl. No.: 415,908

[52] U.S. Cl. .................. 423/263; 423/472; 252/317
[51] Int. Cl.² ........................................ C01F 17/00
[58] Field of Search ............. 423/263, 472; 252/317

[56] References Cited
UNITED STATES PATENTS

| | | |
|---|---|---|
| 1,951,718 | 3/1934 | Ziese et al .................. 423/263 UX |
| 3,821,356 | 6/1974 | Baldwin .......................... 423/263 X |

Primary Examiner—Herbert T. Carter
Attorney, Agent, or Firm—William S. Brown; Donald R. Fraser

[57] ABSTRACT

Microporous rare-earth oxyhalides are prepared by reacting a rare-earth halide with an alkylene oxide in a polar solvent at room temperature. The precipitate or gel formed by the reaction, after being dried in an air stream at temperatures up to 600° C, is a rare-earth oxyhalide consisting of a microporous solid.

5 Claims, No Drawings

PREPARATION OF MICROPOROUS RARE-EARTH OXYHALIDES

BACKGROUND OF THE INVENTION

The rare-earth elements, sometimes referred to as the lathanoid series in the Periodic Table, consists of a group of elements having atomic numbers from 57 to 71. The rare-earth oxyhalides of these metals are well known to those versed in the art, but the existence of such rare-earth oxyhalides having a high surface area and microporous structure heretofore is unknown.

Processes for producing metal oxides or mixed metal oxides or alkaline earth oxychlorides having high surface areas have been known for some time. U.S. Pat. No. 1,951,718 to Ziese et al. describes a method of producing sols and highly dispersed suspensions by dissolving metal salts in a suitable solvent, preferably water, and reacting the salt with an alkylene oxide. Ziese et al. point out that by reacting alkylene oxides with solutions of salts of heavy metals or alkaline earth metals and removing the glycol ester formed together with unaltered alkylene oxide, highly dispersed suspensions containing the metal oxide are obtained.

Another means of preparing metal oxides having a high surface area is illustrated in U.S. Pat. No. 3,243,368 to Mulaskey. Mulaskey prepares a catalyst containing a group VIII metal halide with at least one alkylene oxide containg 2 to 3 carbon atoms per molecule. The halide and alkylene oxide are added to a mixture containing a silica sol and at least one other metal halide soluble in said silica sol.

Mulaskey in his other U.S. Pat. No. 3,267,043 describes a method of preparing a Chromia-Boria Gel. He reacts a chromium compound, preferably the halide, boric acid, and an epoxide in the presence of a solvent to obtain a hydrogel.

While the prior art has obtained metal oxides and oxychlorides of alkaline earth metals as mentioned, such has not been achieved with the rare-earth metals.

Accordingly, it is the primary object of our invention to provide a method whereby rare-earth oxyhalides may be prepared in a physical form consisting of microporous granules or powders having substantial surface area.

It is a further object of our invention to provide a method of preparing materials suitable for use as heterogeneous catalysts, adsorbents or phosphors in the form of microporous rare-earth oxyhalides.

Our invention provides a means for preparing rare-earth oxyhalides in a physical form consisting of microporous granules or powders having substantial surface area. The rare-earth oxyhalides of our invention typically possess surface areas of from 20 to 60 square meters per gram. Basically, the oxyhalides of our invention are prepared according to the reaction:

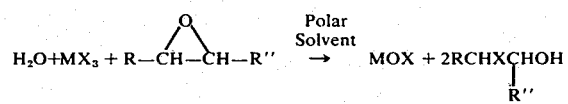

wherein M represents a rare-earth element having an atomic number from 57 to 71; X represents a halide from the group of bromine, chlorine, and iodine; R represents hydrogen or lower alkyl; and, R" represents hydrogen or lower alkyl.

A limited amount of water must be present in the above reaction in order to produce the oxyhalides of our invention. When using the anhydrous $MX_3$ as a starting material, water should be present in the solvent mix. When employing the hydrated $MX_3$, no additional water need be added to the system.

The alkylene oxides which we employ must be soluble in the polar solvent and include such materials as ethylene, propylene, and butylene oxides. Of these however, ethylene and propylene oxides are preferred due to their lower cost and ready availability.

We have found a wide variety of polar solvents to be suitable for use in the present invention. Among others, alcohols, water, ketones, and mixtures thereof are suitable for use. Acetone and methyl ethyl ketone are illustrative of suitable ketones. Low boiling alcohols are preferred solvents and include such materials as methanol, ethanol, propanol, or isopropanol and butanol. Certainly other suitable solvents can be readily discerned by one knowledgeable in the art, so long as both the rate-earth halide and alkylene oxide are mutually soluble therein.

In preparing the rare-earth oxyhalides of our invention, one may start by dissolving a hydrated rare-earth halide ($MX_3$) in a low-boiling alcohol or other suitable solvent. Methanol is a suitable alcohol, however, other alcohols such as ethanol, propanol or butanol are equally well suited for this purpose. Once the $MX_3$ solution is prepared, it is mixed with a solution of an alkylene oxide, such as ethylene oxide or propylene oxide. On mixing, it is preferred that both solutions be at or near room temperature. While the temperature is not a critical factor, it should be low enough to avoid boiling over during the ensuing exothermic reaction. Upon standing for a period of time a precipitate appears. In the case of certain elements the precipitate is in the form of a semi-solid gel. Generally the time varies from a few minutes to several hours before the mixture forms a precipitate. The rare-earth oxyhalide forms the precipitate or semi-solid gel while the halohydrin remains dissolved in the solvent. The solid or gel precipitate is then dried at temperatures up to 600°C, and is found to be predominantly the rare-earth oxyhalide, with a surface area typically greater than 20 square meters per gram. Surface area measurements were determined by the nitrogen B.E.T. method.

In preparing a $MCl_3$ solution, it was found that about one gram formula weight of the hydrated rare-earth chloride for each liter of alcohol is satisfactory. A temperature range from 0° to 25°C was acceptable, and a ratio of approximately 3 moles of alkylene oxide to one gram formula weight of the rare-earth chloride yielded good results. While the concentrations of $MCl_3$ and alkylene oxide are not critical, it was found that the alkylene oxide must be present in excess over the stoichiometric quantity. Best results were obtained by use of a 25 to 50 percent excess.

In separating the solid or semi-solid product from the resulting reaction mixture, conventional methods such as filtration, centrifugation and evaporation may be employed.

While drying temperatures up to 600°C are preferable, the drying time and temperature of the product is not a critical feature to our process. We have found that temperatures in the range of about 400° to 700°C are adequate to achieve drying from 1 to 16 hours.

In order to more fully illustrate the process of our invention, the following examples are offered.

EXAMPLE 1

DyOCl was prepared according to the following procedure. 63.8 grams of $CyCl_3 \cdot 6H_2O$ was mixed with 169 ml of methanol. The mixture was centrifuged and 150 ml of clear supernatant was recovered. The mixture was centrifuged to remove insoluble impurities present in commercially obtained rare-earth halide. The recovered supernatant was then mixed with 210 ml of 3 M propylene oxide in methanol at room temperature. Within 1 ½ hours a stiff yellow gel formed. This gel was air dried and rinsed with ether. The product was then heated under a vacuum at 600°C for 16 hours. The product was a porous black material which contained 14.0 percent Cl, corresponding to 85 percent DyOCl. After roasting at 600°C under a flow of air for 16 hours, the material became light yellow in color, and was found to contain 14.3 percent Cl, which would correspond to a composition of 86 percent DyOCl, the remainder being $DY_2O_3$.

EXAMPLE 2

In the same manner as Example 1, the oxychlorides of Ce, Gd, Nd, Pr, and Er were prepared. However, the reactions using Ce, Nd, and Gd, did not produce stiff gels, but rather a thick syrup formed. These syrups were dried and treated in the same manner as the stiff gel of Example 1. When these materials were roasted at 600°C under vacuum overnight, they contained the amounts of Cl and characteristics as set forth in Table 1, X-ray analysis showed each product to be the rare-earth oxychloride. Further roasting at 600°C under an air flow resulted in the compositions shown in Table 2.

TABLE 1.

| Rare-earth Metal | Weight-percent Cl | Percent MOCl |
|---|---|---|
| Ce | 13.0 | 70 |
| Er | 10.0 | 62 |
| Gd | 16.8 | 99 |
| Nd | 18.1 | 100 |
| Pr | 16.3 | 89 |

TABLE 2.

| Rare-earth metal | Weight-percent Cl | Percent MOCl | Surface area (BET method) m²/g |
|---|---|---|---|
| Ce | <0.5 | 0 | — |
| Er | 6.4 | 40 | 27.9 |
| Gd | 17.9 | 100 | 70.1 |
| Nd | 16.6 | 92 | 59.8 |
| Pr | 14.7 | 80 | — |

As shown in Table 2, it was discovered that Ce should not be exposed to oxygen during the roasting period or the oxychloride is destroyed.

In a similar manner, corresponding results can be expected in the preparation of the rare-earth oxybromides and rare-earth oxyiodides.

Our invention as described herein may be embodied in other specific forms without departing from the spirit or essential characteristics thereof. The present embodiments are therefore to be considered in all respects as illustrative and not restrictive.

We claim:

1. A process for preparing a microporous oxychloride of a rare-earth metal selected from the group consisting of Ce, Pr, Nd, Gd, Dy and Er comprising the steps:
   a. forming a solution of a hydrated chloride of said rare-earth metal in a polar solvent;
   b. mixing said solution with an amount of an alkylene oxide 25 to 50 percent in excess of the stoichiometric amount necessary to form the oxychloride;
   c. allowing the mixture to react for a time sufficient to form a solid or semi-solid product;
   d. separating the resulting solid or semi-solid product from the reaction mixture; and
   e. drying said product in substantial absence of oxygen and at a temperature of about 400° to 700°C for about 1 to 16 hours whereby a microporous oxychloride having a surface area of at least 20 square meters per gram is obtained.

2. The process according to claim 1, wherein the alkylene oxide is selected from the group consisting of ethylene oxide and propylene oxide.

3. The process according to claim 2, wherein the polar solvent is an alcohol.

4. The process according to claim 3, wherein the alcohol is methanol.

5. The process according to claim 1 in which the hydrated rare-earth chloride is a hexaydrate.

* * * * *